United States Patent
Khan et al.

(10) Patent No.: US 6,753,362 B2
(45) Date of Patent: Jun. 22, 2004

(54) COLD BOND ADHESIVE

(75) Inventors: Amir G. Khan, Pequannock, NJ (US); Michael D. De Souto, Somerset, MA (US)

(73) Assignee: Building Materials Investment Corporation, Wilmington, DE (US)

( * ) Notice: Subject to any disclaimer, the term of this patent is extended or adjusted under 35 U.S.C. 154(b) by 137 days.

(21) Appl. No.: 10/016,836

(22) Filed: Dec. 7, 2001

(65) Prior Publication Data

US 2003/0109606 A1 Jun. 12, 2003

(51) Int. Cl.$^7$ .................................................. C08L 9/00
(52) U.S. Cl. ........................... 524/62; 524/59; 524/68; 524/76; 524/71; 106/278; 106/281.1; 106/284.02; 106/284.06
(58) Field of Search .............................. 524/62, 59, 68, 524/76, 71; 106/278, 281.1, 284.02, 284.06

(56) References Cited

U.S. PATENT DOCUMENTS

| | | | | |
|---|---|---|---|---|
| 4,196,115 A | * | 4/1980 | Bresson | 524/68 |
| 4,430,465 A | * | 2/1984 | Abbott | 524/64 |
| 4,759,799 A | * | 7/1988 | Vicenzi | 106/284.06 |
| 4,824,880 A | * | 4/1989 | Algrim et al. | 524/62 |
| 5,004,772 A | * | 4/1991 | Grzybowski et al. | 524/62 |
| 5,529,621 A | * | 6/1996 | Hudson et al. | 106/278 |
| 5,612,141 A | * | 3/1997 | Davis et al. | 428/515 |
| 5,618,340 A | * | 4/1997 | Krogh et al. | 106/284.06 |
| 5,730,791 A | * | 3/1998 | Krogh et al. | 106/284.06 |
| 5,979,133 A | * | 11/1999 | Funkhouser | 52/408 |
| 6,306,937 B1 | * | 10/2001 | Fields | 524/62 |
| 6,543,199 B1 | * | 4/2003 | Tomlinson et al. | 52/746.11 |

* cited by examiner

Primary Examiner—David W. Wu
Assistant Examiner—Satya Sastri
(74) Attorney, Agent, or Firm—Marilyn J. Maue; William J. Davis

(57) ABSTRACT

An adhesive composition which requires no applied heat to effect curing and which produces a strong bond between a polymeric capping membrane suitably employed in roofing or siding and a roofing or siding base or substrate which composition essentially comprises a homogeneous 60 to 75% solids mixture of (a) between about 0.5 and about 15 wt. % of a thermosetting styrene/isoprene/styrene block polymer containing up to 90% styrene;

(b) between about 13 and about 30 wt. % aromatic hydrocarbon solvent containing from about 5 to about 20 wt. % aliphatic hydrocarbon;

(c) between about 20 and about 70 wt. % non-blown asphalt optionally containing a minor amount of blown asphalt;

(d) between about 1 and about 10 wt. % metal silicate and (e) between about 0.1 and about 5 wt. % of a $C_6$ to $C_{16}$ alkoxyalkyl amine substituted ester of a $C_2$ to $C_{12}$ carboxylic acid as a surfactant.

The invention also relates to the method of preparing and using the above adhesive composition.

20 Claims, No Drawings

US 6,753,362 B2

COLD BOND ADHESIVE

FIELD OF THE INVENTION

This invention relates to an adhesive composition which is rapidly curable at room temperature used for joining a substrate of construction with a solid capping sheet, particularly bonding a roofing deck or siding member to a polymeric capping member to provide a strong bond therebetween at reduced adhesive cure time.

BACKGROUND OF THE INVENTION

Although cold bond adhesive compositions are known and employed in the construction industry, one of the major objections to their use is the residual unpleasant odor emitted during mixing and curing operations. It is found that the objectionable odor is attributable to the need for high concentrations of aromatic solvents, particularly xylene, toluene and the like. Another objection to these adhesive compositions, e.g. styrene/ethylene/butylene/styrene (SEBS) adhesives, is the long curing time, which in many cases more than 30 days, is required to achieve complete curing and bonding of the substrate to a second member. During the curing period, unfavorable wind or storm conditions often cause "blow-off" or "lift-off" of the second member before bonding can be completed.

Certain polypropylene compositions used as lap, field and trowel adhesives to unite roofing and siding membranes or to seal seams between sheets of such structural coverings required torching in order to cure the polymer and to obtain a strong bond with high peel strength. The process involving heat treatment requires additional equipment for bonding and is associated with many hazards including flammability and injury to the applicator. Further, the step of torching is time consuming and often promotes non-uniformity in the degree and areas of attachment.

Accordingly it is an object of this invention to provide an improved room temperature-curable adhesive system which achieves equal peel strength at least equal to the prior heat cured adhesives and eliminates the dangers associated with torching.

Another object is to provide an adhesive sealant which is deformable in conformity to changes in membrane joints during the process of curing and which possesses high weatherability and thermal stability as well as resistance to degradation by heat, water, chemicals and exposure to ozone.

Another object is to provide a rapid curable cold bond adhesive composition containing a significantly reduced concentration of odoriferous aromatic solvent.

Another object is to provide a cold bond adhesive composition of improved tack and pliability which is readily trowled or mopped on the surface of a substrate.

Still another object is to disclose a commercially feasible and economical process for the preparation of the improved adhesive composition of the present invention.

Yet another object is to provide a cold bond adhesive which reduces cure time by at least 2-fold over others in this category.

These and other objects and advantages will become apparent from the following description and disclosure.

SUMMARY OF THE INVENTION

In accordance with this invention there is provided an adhesive composition which is curable at ambient temperature in less than 20 days to achieve a strong bond between a capping membrane suitably employed in roofing or siding and a roofing or siding base or substrate member which composition essentially comprises a homogeneous 60 to 75% solids mixture of (a) between about 0.5 and about 15 wt. % of a thermosetting styrene/isoprene/styrene block polymer containing up to 90% styrene;

(b) between about 13 and about 30 wt. % aromatic hydrocarbon solvent containing from about 5 to about 20 wt. % aliphatic hydrocarbon;

(c) between about 20 and about 70 wt. % non-blown asphalt optionally containing a minor amount of blown asphalt;

(d) between about 1 and about 10 wt. % metal silicate and (e) between about 0.1 and about 5 wt. % of a $C_6$ to $C_{16}$ alkoxyalkyl amine substituted ester of a $C_2$ to $C_{12}$ carboxylic acid as a surfactant.

Optionally the above composition can additionally contain (f) up to 30 wt. % of an anhydrous inorganic filler; (g) up to 10 wt. % reinforcing fibers; (h) up to 5 wt. % water and (i) up to 5 wt. % thermoplastic latex.

It is discovered that at less than 13% of solvent (b), the composition becomes too viscous to achieve homogeneity and requires a curing time extended by one to several days. It is also found that less than 20% asphalt (c) significantly reduces tack; whereas above 70%, the adhesive has diminished spreadability. Accordingly, these limitations are critical to obtaining the homogeneous adhesive composition of the present invention having a rapid cure time decreased at least 2-fold over prior cold bond adhesives.

DETAILED DESCRIPTION OF THE INVENTION

A primary aspect of the present invention involves the bonding of a polymeric capping sheet or member to a non-polymeric substrate used in construction such as a metal, cement or plywood roof deck or siding base member. The composition of suitable capping members are those used commercially and include homopolymers and block polymers of $C_2$ to $C_8$ unsaturated hydrocarbons, such as for example polybutadiene, polyisoprene, high density polyethylene, and block polymers of styrene and butadiene (SBS or SBR) with atactic polypropylene (APP) or hydroxylated derivatives thereof (SEPS). Other block polymers, such as styrene/isoprene (SIR), ethylene/propylene/diene (EPDM), ethylene/propylene (EBM) and styrene/ethylene/butylene/styrene (SEBS) also can be employed as capping member sheets. Of these, APP/SBS is preferred for use with the present adhesive composition.

The preferred adhesive of the invention has a Brookfield viscosity of from about 60 to 140 cps and a penetration of from about 50 to 120 decimillimeters (dmm) at 25° C. The preferred concentrations of components in the composition, are by weight, of 1.5–8% (a) block polymer containing 70–85% styrene; 15–22% solvent (b); 25–55% asphalt (c); 6–7% metal silicate (d); 0–1.5% surfactant (e); 0–10% filler (f) and 1–4% reinforcing fibers (g). A weight ratio of 1:8–12 (e) to (f) and a 3–10% concentration of aliphatic hydrocarbon in solvent (b) is optimally employed. Also, a blown asphalt concentration not in excess of 10% in (c) is recommended.

The present adhesive composition can be used as a field adhesive for bonding the substrate to a capping member resulting in a roofing or siding assembly of superior strength. The composition can also be employed as a lap adhesive to seal overlaid sections and side seams of building material sheets or shingles or as a more viscous trowel adhesive, particularly adapted to vertical substrates such as siding. When employed as a field adhesive, a Brookfield viscosity of 60–140 cps, preferably 70–120 cps, using spindle 4 at 3 rpm is most highly recommended. The % solids characterizes the primary distinction among the above specific uses; i.e. the field adhesive desirably contains 60–70% solids; the lap adhesive desirably contains 65–70% solids and the trowel adhesive contains 70–75% solids.

In the above composition, suitable solvents (b) include mineral spirits, toluene, xylene, naphthas and other aromatic hydrocarbons containing 9 to 12 carbon atoms. To minimize the objectionable odor of the monocyclic aromatic compounds, a minor amount of $C_6$ to $C_8$ aliphatic hydrocarbon is employed. A particularly preferred solvent mixture contains from about 60 to about 90 wt. % aromatic hydrocarbon, e.g. naphtha, and from about 10 to about 40 wt. % of an individual $C_6$ to $C_8$ aliphatic hydrocarbon or a mixture of these aliphatics.

The asphalt of component (c) may be modified with a $C_8$ to $C_{12}$ hydrocarbon, as in cut back asphalts, to increase flowability when desired. The asphalt in the above composition acts as a tackifier and is preferably used in a weight ratio of from about 1:1.34, most preferably from about 1:1.5–3, component (b) to component (c).

The homogeneity of the adhesive composition is enhanced by the metal silicate component (d) which, in concert with the surfactant of component (e), acts to augment wetting and coalescing properties. Suitable metal silicates include substantially anhydrous minigels of calcium, magnesium and/or aluminum silicates. Preferred of this group are thixotropic minigels, e.g. Mg silicate, e.g. MINUGEL™ G-35 and MINUGEL™ AR. Attapulgite and montmorillonite clays, as well as mixtures of the above, are also suitably employed as component (d) in the present composition.

The surfactant component (e) is non-ionic cationic or a mixture thereof and is a $C_6$ to $C_{16}$ alkoxyalkyl amino substituted ester of a $C_2$ to $C_{12}$ carboxylic acid. These esters can be derived from $C_6$ to $C_{16}$ rich alcohol mixtures. Examples of such surfactants include isodecyloxypropylamino acetate, dodecyloxyethylamino butyrate, nonyloxybutylamino acetate, etc. Of these, isodecyloxypropylamino acetate is preferred.

The anhydrous inorganic filler of the composition includes carbon black; metal oxides, e.g. calcium, magnesium, aluminum, titanium and zinc oxides; metal carbonates and/or metal sulfides and the like. Inert anhydrous materials such as talc, clay, mica, diatomaceous earth, natural rubber particles petroleum resin and the like can also be used as extenders for the adhesive in a form and amount which does not cause phase separation.

The fibers employed in the composition for added body, strength and reinforcement, are also employed in a form and amount which avoids phase separation. For the present purposes, cellulose fibers having a diameter of not more than 0.06 mm, preferably between about 0.01 and about 0.03 mm, are employed. Most preferred are those fibers having a length of between about 0.05 and about 1.5 mm. To customize the adhesive for particular applications, water or a thermoplastic latex can be added to adjust the viscosity of the composition. Other excipients, such as a hindered phenolic antioxidant, a UV absorber, etc. are optionally added to the composition to perform particular preferences and functions.

In general the adhesive composition of this invention is a homogeneous product preferably containing between about 65 and about 70 wt. % solids. The viscosity of the preferred composition is 70–120 cps and the weight is between about 7.5 and 10 lbs/gal. The composition can be troweled, mopped or sprayed on the substrate membrane surface at ambient temperature to provide a durable, weather resistant adhesive coating having high peel strength and excellent moisture impervious properties.

One method of preparing the above described adhesive composition comprises mixing component (a) and solvent (b) in a high speed mixer preferably operated at a speed of between about 200 and 400 rpm, to provide a homogeneous liquid. The silicate gel, surfactant and non-blown asphalt which may contain an added $C_8$ to $C_{12}$ hydrocarbon, are separately combined and stirred in a mixer operating at a low speed not in excess of 100 rpm, preferably between about 40 and about 75 rpm. Filler and fibers are subsequently introduced into the silicate mixture and, after a uniform mixture is obtained, the solvent/polymer mixture is introduced and mixed at low speed to provide the homogeneous adhesive product of the present invention which is collected and stored in sealed containers to prevent curing due to solvent loss. This process is effected at ambient or room temperature, i.e. between about 45° and about 100° F.

A viable alternative to this process involves mixing all or at least a portion of the asphalt component (c) with (a) and (b), and combining any remaining portion of (c) with the silicate gels (d) for subsequent addition to the mixture containing (a) and (b).

A typical roofing or siding assembly, wherein the present adhesive is employed to bond layers or seal seams between underlayment strips or sheets, can include a top or cap sheet, usually having 2 to 6 inch overlapping margins or selvage edges; an intermediate insulation layer and a bottom base sheet, which assembly is placed over a wood, metal or cement roof deck or construction siding. The top or capping sheet in the roofing assembly is desirably surfaced with weather resistant mineral granules. When the adhesive is applied on a membrane to unite sheets or to affix granules on a membrane surface, coatings of from about 1.5 to about 2.5 gals/square of membrane or coatings of 0.1 to 50 mils thickness have been found useful. A somewhat lighter, or lower viscosity coating, between about 0.6 and about 0.85 gals/sq. can be used when sealing abutted or overlapping seams of membrane sheets. Generally, the cure time for the present composition is from 40 hours to 20 days depending on atmospheric conditions.

Having generally described the invention, reference is b now had to the following examples which illustrate preferred embodiments but which are not to be construed as limiting to the scope of the invention as set forth in the appended claims.

EXAMPLE 1

Part A

Into a stainless steel mixer, 538.65 g. of 92.27% styrene/isoprene/styrene block polymer (SIS) containing 7.73% SBS elastomer (D 1111), supplied by Shell Chemical Co.) was mixed with 65 g of aromatic naphtha solvent (HI-SOPL supplied by Koch Chemicals at high speed (300 rpm) until dissolved.

Part B

In a separate stainless steel twin screw mixer, the following composition was prepared by adding the components in the order listed and mixing the components until a uniform composition was obtained.

| COMPONENT | Wt. % |
|---|---|
| 1. x100% non-blown asphalt at about 420 F. | 63.94 |
| 2. 50/50% mixture of naphtha/xylene (KWIK DRI ™ 66)* | 18.46 |
|     Mineral Spirits | 4.5 |
| | 2.1 |
| 3. Isodecyloxypropyl amino acetate (PA-14) | 0.5 |
| 4. Magnesium silicate (MINUGEL ™ 35) | 6.5 |
| 5. Cellulose fiber | 2.0 |

*Stoddard solvent

95% of the above composition (Part B) was then added to 2% SIS in solution (Part A) and mixed with a high speed Cowl blade mixer at ambient temperature until uniform. The resulting adhesive composition had a Brookfield viscosity of about 100 cps.

EXAMPLE 2

At ambient temperature (about 80° F.) the adhesive product of Example 1 was coated (1.5 gals/sq) on the top surface of a roofing sheet. A second sheet was placed over the coated sheet and, within 5 hours, the second sheet was attached to the coating. In the absence of applied heat, the contiguous layer of adhesive between the sheets was cured within 7 hours. The resulting assembly had a peel strength substantially equal to that of a heat bonded adhesive, namely about 13.5 foot lbs/inch.

EXAMPLE 3
Formulation for Trowel Adhesive

Example 1 was repeated except that fiber content was increased to 4.5 wt. %. The adhesive product had a penetration of 180 dmm.

The adhesive product of the above example was coated (8 gals/sq.) on the surface of a roofing membrane and allowed to stand at about 85° F. for 40 hours in the absence of applied heat. The product was then examined and found to be completely cured and exhibited high peel strength and a penetration of 170 dmm.

EXAMPLE 4

The properties of Example 1 product were compared with those of Example 3, a commercial cold weld adhesive supplied by Performance Systems. The results are reported in following Table I.

TABLE I

| ADHESIVE | TENSILE STRENGTH* lbs/in lbs ch of lap width | PEEL STRENGTH** lbs/inch of lap width |
|---|---|---|
| Product of Ex. 1 | 141 | 13 |
| Product of Ex. 3 | 55 | 9 |

*using CGSB-51 test
**using ASTM method

METHODS OF COATING MEMBRANES

EXAMPLE 5
Single Surface Coating

A base sheet was mechanically fastened to an isocyanate insulation sheet which covers a steel roof deck. About 1.5 gals/sq of the present field adhesive was applied over the base sheet. Finally a fire retardant top sheet was laid over the coated base sheet. The resultant adhesive was cured within 2 days and exhibited strong adhesion and high peel strength.

EXAMPLE 6
Membranes with Multiple Surface Coatings

A 0.5 inch wood fiber insulation board was mechanically fastened to a wood roof deck and about 1.5 gals/sq of field adhesive was applied over the board. A fiber glass base sheet was placed over the coated insulation board and another application of 1.5 gals/sq. was coated on the exposed surface of the fiber glass base sheet. Finally a fire retardant actactic polypropylene (APP) modified cap sheet was placed over the coated fiber glass sheet. The cure time and product properties were substantially the same as found above in Example 6.

As an alternative to the above example the two coatings of adhesive could be applied to the top and bottom surfaces of the fiber glass sheet in place of the separate applications to the insulation and fiber glass sheets. Many other alternatives within the scope of this invention will become apparent to those skilled in the art.

What is claimed is:

1. A homogeneous roofing and siding adhesive composition suitable for bonding a non-polymeric substrate member to a polymeric capping member which comprises a 60 to 75% solids mixture of
   (a) between about 0.5 and about 15 wt. % of a thermosetting styrene/isoprene/styrene block polymer containing up to 90% styrene;
   (b) between about 13 and about 30 wt. % aromatic hydrocarbon solvent containing from about 5 to about 20 wt. % aliphatic hydrocarbon;
   (c) between about 29 and about 70 wt. % non-blown asphalt optionally containing a minor amount of blown asphalt;
   (d) between about 1 and about 10 wt. % metal silicate;
   (e) between about 0.1 and about 5 wt. % of a $C_6$ to $C_{16}$ alkoxyalkyl amine substituted ester of a $C_2$ to $C_{12}$ carboxylic acid;
   (f) from 0 to about 30 wt. % anhydrous inorganic filler;
   (g) from 0 to about 10 wt. % reinforcing fibers;
   (h) from 0 to about 5 wt. % water and
   (i) from 0 to about 5 wt. % thermoplastic latex.

2. The adhesive of claim 1 wherein the composition contains between about 1 and about 4 wt. % (g).

3. The adhesive of claim 1 wherein the composition contains, by weight, between about 1.5 and about 8% (a) block polymer containing 70–85% styrene; between about 15 an about 22% solvent (b); between about 25 and about 55% asphalt (c); between about 6 and about 7% metal silicate (d); between about 0.3 and about 1.5% surfactant (e); between about 2 and about 10% filler (f) and between about 1 and about 4% reinforcing fibers (g).

4. The adhesive of claim 1 wherein the weight ratio of (b) to (c) is 1:1.3–4.

5. The adhesive of claim 1 having a Brookfield viscosity of from about 60 to about 140 cps.

6. The adhesive of claim 1 wherein said solvent of (b) is a mixture of 60–90 wt. % aromatic and 10–40 wt. % $C_6$ to $C_8$ aliphatic hydrocarbon.

7. The adhesive of claim 6 wherein said aromatic is naphtha.

8. The adhesive of claim 1 wherein surfactant (e) is cationic.

9. The adhesive of claim 8 wherein said surfactant is isodecyloxypropyl amino acetate.

10. The adhesive of claim 2 wherein said reinforcing fibers are cellulose fibers having an average length of from about 0.02 to about 1.5 mm.

11. The adhesive of claim 1 wherein said metal silicate is magnesium silicate.

12. The adhesive of claim 1 which is a field adhesive of between about 60 and about 70% solids.

13. The adhesive of claim 1 which is a lap adhesive of between about 65 and about 70% solids.

14. The adhesive of claim 1 which is a trowel adhesive of between about 70 and about 75% solids.

15. A process for preparing the adhesive composition of claim 1 which comprises:
   (i) mixing components (a), (b) and optionally a portion or all of component (c) at ambient temperature in a high speed mixer until a homogeneous liquid is obtained;
   (ii) separately blending any remaining portion of (c) and the remaining components of claim 1 in a low speed mixer until the components are uniformly distributed;
   (iii) adding the homogeneous liquid to the uniformly blended mixture with gentle agitation at ambient temperature to recover a homogeneous, spreadable adhesive product.

16. A roofing or siding membrane having at least a portion of its surface coated in a thickness of between about 0.1 and about 50 mils with the adhesive composition of claim 1.

17. The membrane of claim 16 wherein said membrane has at least one marginal boundary portion coated with said adhesive in an area effective to adhere to a corresponding marginal boundary portion of a successive membrane.

18. The membrane of claim 16 wherein said membrane is coated over at least one of its upper and lower surfaces with said adhesive to adhesively bind said coated membrane to an adjacent membrane.

19. The process which comprises coating at least a portion of a roofing or siding membrane with the adhesive composition of claim 1 in a thickness of between about 0.1 and about 50 mils and allowing the adhesive composition to cure at ambient temperature.

20. The process of claim 19 wherein said adhesive composition is cured at a temperature of between about 40° and about 100° F. in the absence of applied heat.

* * * * *